Aug. 19, 1958 J. R. DIAZ 2,848,273
STATION WAGON CONVERTIBLE SEAT
Filed Sept. 28, 1956 2 Sheets-Sheet 1
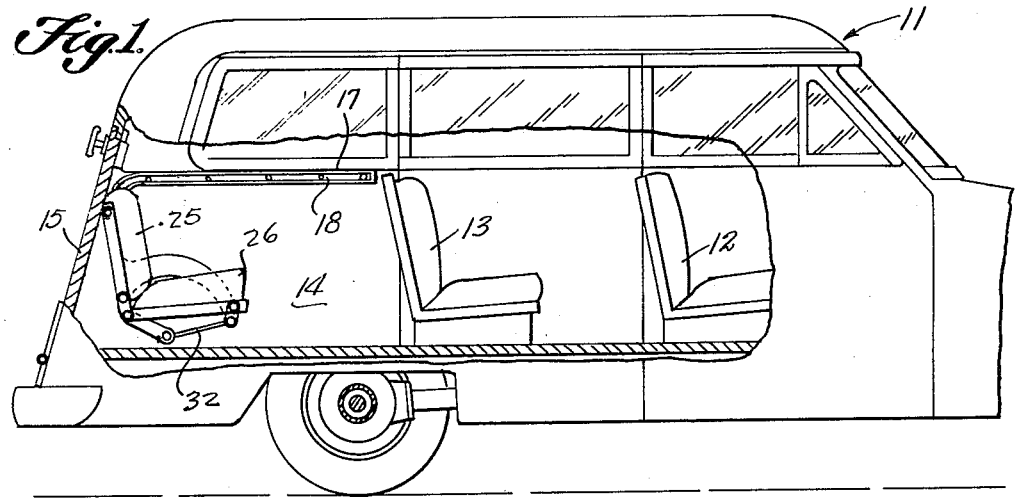
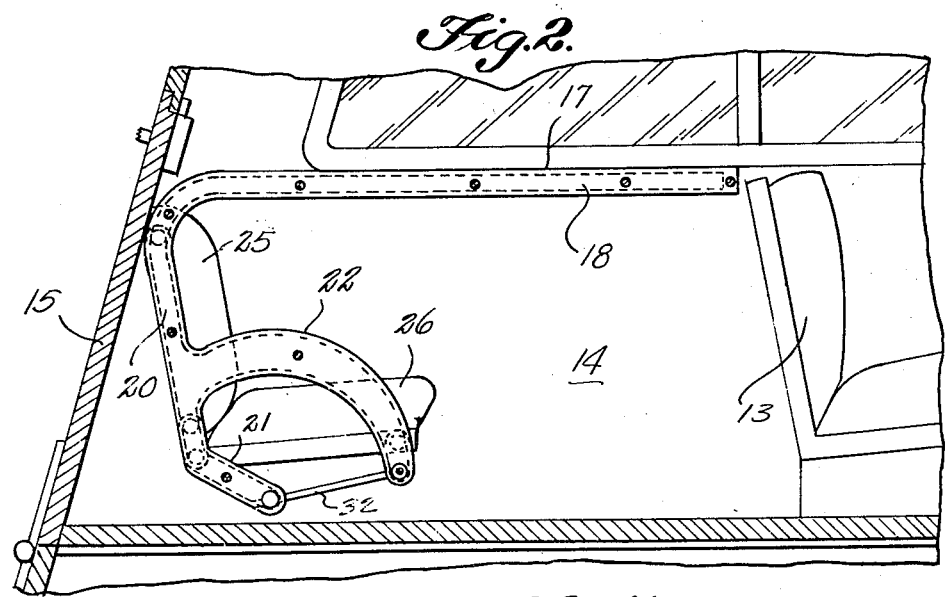
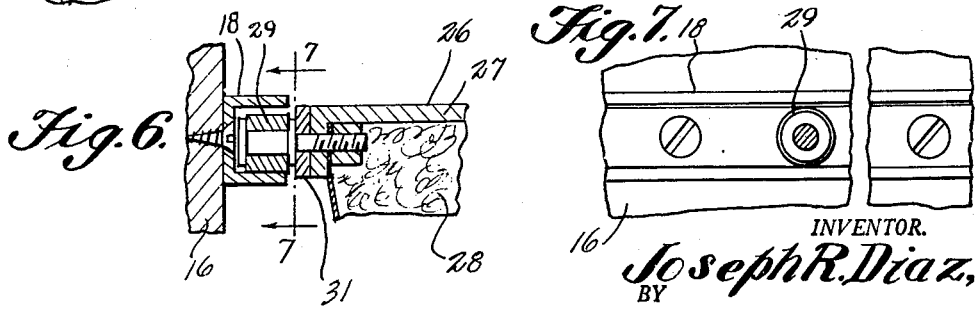
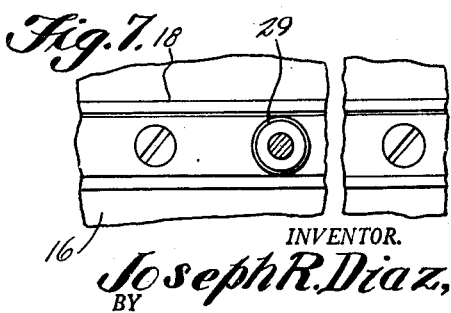
INVENTOR.
Joseph R. Diaz,
BY
McMorrow, Berman & Davidson
ATTORNEYS Aug. 19, 1958
J. R. DIAZ
2,848,273
STATION WAGON CONVERTIBLE SEAT
Filed Sept. 28, 1956
2 Sheets-Sheet 2
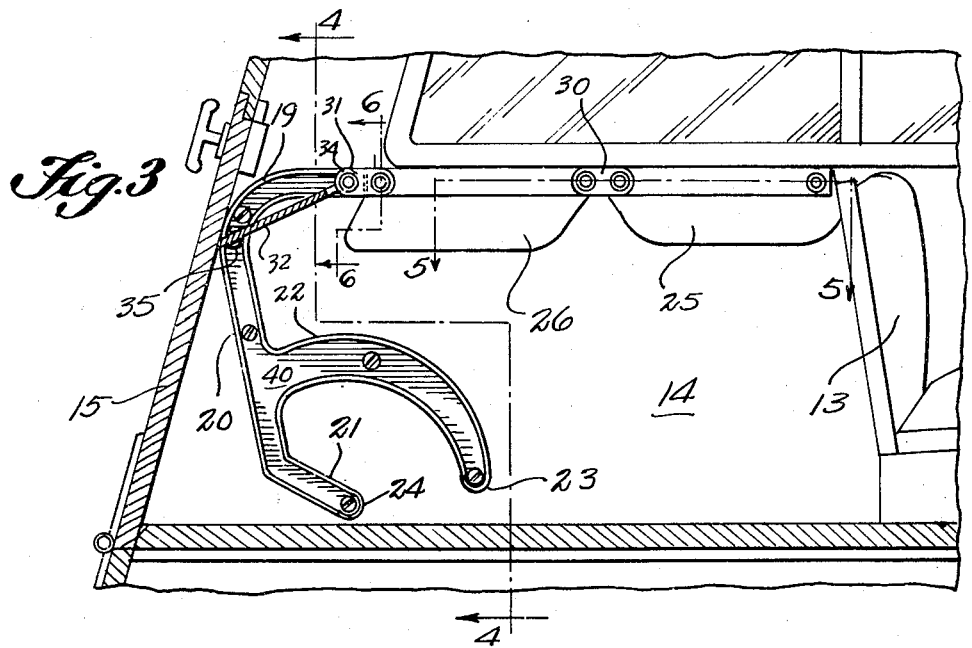
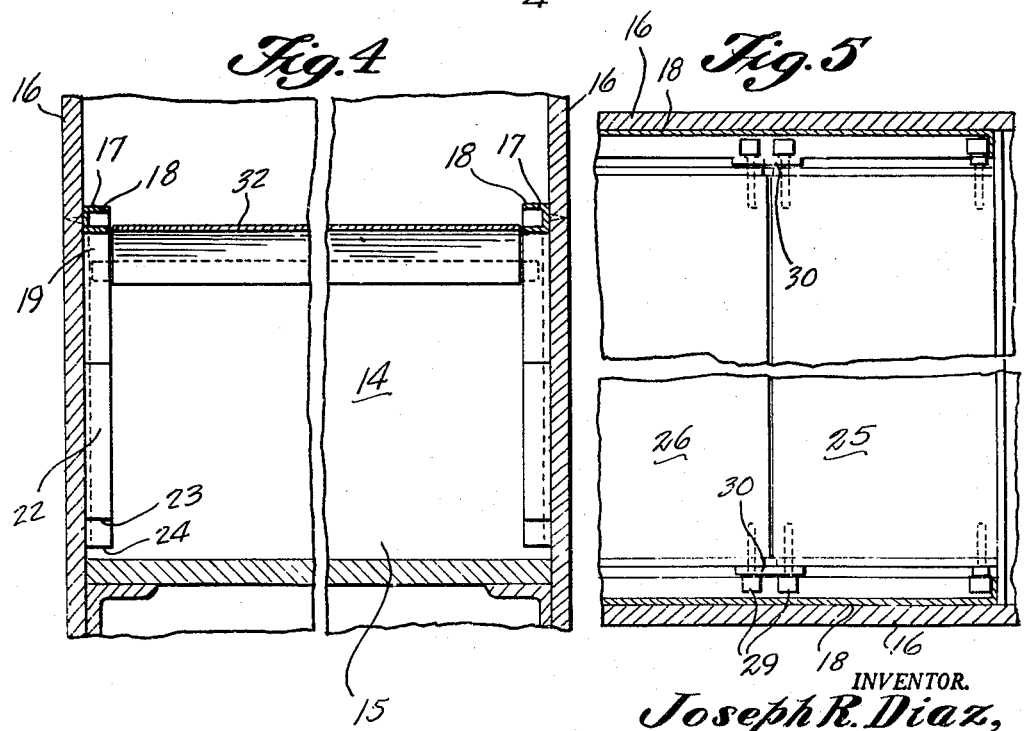
INVENTOR.
Joseph R. Diaz,
BY
McMorrow, Berman & Davidson
ATTORNEYS

United States Patent Office 2,848,273
Patented Aug. 19, 1958

2,848,273
STATION WAGON CONVERTIBLE SEAT
Joseph Raymond Diaz, El Paso, Tex.

Application September 28, 1956, Serial No. 612,689

3 Claims. (Cl. 296—65)

This invention relates to motor vehicles, and more particularly to a convertible seat structure in a station wagon adapted to be used at times as a cover for the storage compartment of the station wagon and adapted to be readily converted into an extra seat, when so desired.

The main object of the invention is to provide a novel and improved convertible third seat for a station wagon, said seat being arranged so that it at times may be employed as a cover for the storage compartment of the station wagon, and may be readily converted into a seat, when its use is required, the structure involving simple components, being easy to install, and being smooth in operation.

A further object of the invention is to provide an improved convertible seat structure for a station wagon, said structure involving inexpensive parts, being rugged in construction, and being easy to manipulate.

Further objects and advantages of the invention will become apparent from the following description and claims, and from the accompanying drawings wherein:

Figure 1 is a fragmentary side elevational view, partly in vertical longitudinal cross section, of a station wagon provided with an improved convertible seat according to the present invention, the seat being shown in operative position.

Figure 2 is an enlarged fragmentary longitudinal vertical cross sectional view similar to Figure 1, showing the track members and the seat in side elevation, as employed in the arrangement illustrated in Figure 1.

Figure 3 is a cross sectional view, similar to Figure 2, but showing the seat elements in their elevated horizontal positions, serving as part of the covering for the storage compartment of the station wagon.

Figure 4 is a transverse vertical cross sectional view taken substantially on the line 4—4 of Figure 3.

Figure 5 is a horizontal cross sectional view taken substantially on the line 5—5 of Figure 3.

Figure 6 is an enlarged cross sectional detail view taken on the line 6—6 of Figure 3.

Figure 7 is a cross sectional detail view taken on the line 7—7 of Figure 6.

Referring to the drawings, 11 generally designates a station wagon having the usual seats 12 and 13 and having a rear storage compartment 14 to which access may be had by opening a rear door 15.

Secured to the inner surfaces of the opposite side walls 16, 16 of the station wagon body in the rear storage compartment 14 are a pair of horizontally aligned, inwardly facing track members 17, 17, said track members being formed with the substantially horizontal top portions 18, 18, with the arcuately curved end portions 19 and with the downwardly and forwardly inclined lower portions 20, said lower portions extending downwardly on the side walls 16, 16 and being provided at their lower ends with the terminal portions 21 which are inclined downwardly and forwardly with respect to the lower ends of the main track portions 20, as is clearly shown in Figure 3. Said main track portions 20 are integrally formed at their intermediate portions with the arcuately curved, downwardly and forwardly extending auxiliary track elements 22, diverging from said intermediate portions, each of which is formed at its end with a closed portion 23 spaced forwardly from and slightly above the level of a similar closed portion 24 formed on the end of its associated downwardly and forwardly inclined track element 21, as shown in Figure 3.

As shown in Figure 3, the arcuately curved auxiliary track elements 22 are relatively wide adjacent their junctions with the associated main track section 20 and taper in width toward their closed end portions 23.

As above mentioned, the opposing track members 17 are identical in shape and are transversely aligned with each other so that the respective portions of said opposing track members are parallel with each other.

Designated at 25 and 26 are a pair of articulated cover elements, said cover elements being upholstered on their lower sides, as viewed in Figure 3, whereby the cover elements may be at times employed as components of a seat.

As shown in Figure 6, the cover element 26 comprises a rigid backing plate 27 in which the upholstering 28 is secured, said backing plate being provided at its corner portions with rollers 29 engageable in the channel-shaped portions of the respective opposing track members 17, 17. The cover 25 is similarly constructed, and is similarly provided with rollers engageable in the channel-shaped portions of the opposing tracks 17, 17. The cover members 25 and 26 are connected together at their adjacent corner portions by respective link bars 30, 30, engaged with the shaft elements on which the rollers 29 are journaled. Said link bars 30 are freely rotatable on said shaft elements, whereby the cover members 25 and 26 are hinged connected together and may swing freely as the cover members 25 and 26 are moved around the various bends of the track members 17.

Designated at 31, 31 are additional link bars, similar to the link bars 30, which are pivoted to the rear corner portions of the cover member 26, as viewed in Figure 3, namely, which are rotatably engaged on the shaft element of the rollers 29 at the rear corner portions of cover member 26, and pivotally connected between the ends of the link bars 31 is a transversely extending rigid panel member 32, said panel member being secured, for example, to the shafts of roller elements 34 provided at the ends of the link bars 31, the link bars 31 being engaged on the shafts of the roller elements 34 in the same manner as previously described in connection with the link bars 30. Additional rollers 35 are journaled to the rear corner portions of the panel member 32, said additional rollers 35 being received in the guide tracks 17, whereby the rigid panel 32 is articulated with respect to the cover 26 and is movable therewith from the position thereof shown in Figure 3 to the seat-defining position shown in Figures 1 and 2.

Normally, with the cover members 25 and 26 in their elevated horizontal positions, shown in Figure 3, the rear trunk compartment 14 is covered by said elements 25 and 26, and by the panel 32 which is arranged in the manner illustrated in Figure 3, namely, which is inclined downwardly and rearwardly from the rear cover member 26. The rigid backing plates 27 of the cover members 25 and 26 are horizontally aligned and substantially abut each other at their adjoining edges, defining a smooth deck over the storage compartment 14. As shown in Figure 3, the forward cover member 25 is substantially in abutment with the back of the rearward seat 13, substantially closing the space 14 with respect to the normal passenger compartment of the vehicle, However, access may be had to the storage space 14 by opening the rear door 15, as above described.

When it is desired to convert the cover members to a seat, the members 25, 26 and 32 are moved rearwardly along the track members 17, 17, whereby the panel 32 is rotated and moved downwardly along the rear main track members 20 until the rollers 35 engage in the end portions 24 of the downwardly and forwardly inclined bottom segments of said rear main track elements 20. Concurrently with the movement of the panel 32 along the inclined track portions 21, the rollers 34 are engaged in the arcuate auxiliary track segments 22 and guide the cover member 26 toward a generally horizontal position, as shown in Figures 1 and 2, supporting said cover member 26 in its generally horizontal position by the engagement of the rollers 34 with the lower ends 23 of the arcuate track segments 22.

The widened channel areas 40, shown in Figure 3, in the regions where the arcuate channel elements 22 merge with the main elements 20 provide ample clearance for the movement of the rollers 34 into the arcuate track sections 22 while the rollers 35 move downwardly toward the terminal portions 21 of the main track elements 20.

As will be readily apparent, in converting the cover members 25 and 26 into a seat, it is necessary to exert sufficient forward force on the lower portion of the cover member 26 as rollers 34 approach the track areas 40 to rotate the cover member 26 toward the substantially horizontal position thereof, shown in Figures 1 and 2 and to cause the rollers 34 to travel in the arcuate auxiliary track sections 22.

In the final position of the horizontal member 26, its upholstered portion faces upwardly, and the adjacent cover member 25 is supported in the upright position thereof shown in Figures 1 and 2, to define the back of the seat.

To restore the members 25 and 26 to their normal, horizontal elevated positions, shown in Figure 3, the above procedure is merely reversed, the cover member 25 being first elevated, whereby the cover member 26 follows the member 25, eventually drawing the panel member 32 upwardly to the position thereof shown in Figure 3.

While a specific embodiment of an improved convertible seat structure for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle body, a storage space, similarly shaped, horizontally aligned main guide tracks on opposite side walls of said storage space and having downwardly and forwardly inclined lower portions, a pair of articulated cover elements slidably mounted in said guide tracks, said guide tracks being formed with horizontal top portions adapted to support the cover elements at times in horizontal positions over said storage space, a downwardly and forwardly extending auxiliary track element integral with and diverging from an intermediate portion of each of the lower portions of said guide tracks, the auxiliary track elements being formed and arranged to guide one of the cover elements toward a substantially horizontal position, and means connected to said one of the cover elements and slidably engaging in the top portions of the main guide tracks and in the upper part of the lower portions of said main guide tracks, the end portions of each of said means being formed and arranged to move along the lower portions of said main guide tracks and into the terminating ends of the lower portions of said main guide tracks and of said auxiliary track elements to guide said one section to said horizontal position, the remaining cover element being held in substantially upright position by the intermediate part of the lower portions of said main guide tracks.

2. In a vehicle body, a storage space, similarly shaped, horizontally aligned main guide tracks on opposite side walls of said storage space, a pair of cover elements slidably mounted in said guide tracks, means hingedly connecting said cover elements, said guide tracks being formed with horizontal top portions adapted to support said cover elements at times in horizontal positions over said storage space, a downwardly and forwardly extending auxiliary track element integral with and diverging from an intermediate portion of each of the lower portions of said guide tracks, the auxiliary track elements being formed and arranged to guide one of the cover elements toward a substantially horizontal position, and means connected to said one of the cover elements and slidably engaging in the top portions of the main guide tracks and in the upper part of the lower portions of said main guide tracks, the end portions of each of said means being formed and arranged to move along the lower portions of said main guide tracks and into the terminating ends of the lower portions of said main guide tracks and of said auxiliary track elements to guide said one section to said horizontal position, the remaining cover element being held in a substantially upright position by the intermediate part of the lower portions of said main guide tracks, each of said cover elements being provided with upholstery on the portion thereof facing downwardly when the cover elements are in said horizontal positions over the storage space.

3. In a vehicle body, a storage space, similarly shaped, horizontally aligned main guide tracks on opposite side walls of said storage space, a pair of cover elements slidably mounted in said guide tracks, respective link bars connecting said cover elements at their side portions, said guide tracks being formed with horizontal top portions adapted to support said cover elements at times in horizontal positions over said storage space, a downwardly and forwardly extending auxiliary track element integral with and diverging from an intermediate portion of each of the lower portions of said guide tracks, the auxiliary track elements being formed and arranged to guide one of the cover elements toward a substantially horizontal position, and a panel member hinged transversely to the end of said one cover element and slidably engaging in the top portions of the main guide tracks and in the upper part of the lower portions of said main guide tracks, the end portions of said panel member being formed and arranged to move along the lower portions of said main guide tracks and into the terminating ends of the lower portions of said main guide tracks and of said auxiliary track elements to guide said one section to said horizontal position, the remaining cover element being held in a substantially upright position by the intermediate part of the lower portions of said main guide tracks.

References Cited in the file of this patent
UNITED STATES PATENTS
2,582,687    Fisher  ---------------- Jan. 15, 1952